United States Patent [19]

Nakayama

[11] Patent Number: 5,761,904
[45] Date of Patent: Jun. 9, 1998

[54] AIR INLET STRUCTURE FOR EXHAUST PASSAGE IN ENGINE

[75] Inventor: Hiroyuki Nakayama, Tokyo, Japan

[73] Assignee: Honda Giken Kogyo Kabushiki Kaisha, Tokyo, Japan

[21] Appl. No.: 218,945

[22] Filed: Mar. 28, 1994

[51] Int. Cl.⁶ ..................................................... F01N 3/22
[52] U.S. Cl. ................... 60/293; 60/298; 60/305
[58] Field of Search .................. 60/293, 298, 305

[56] References Cited

U.S. PATENT DOCUMENTS

| | | | |
|---|---|---|---|
| 2,295,436 | 9/1942 | Tendler | 60/305 |
| 3,537,257 | 11/1970 | Webster | 60/305 |
| 4,437,305 | 3/1984 | Ikenoya | 60/293 |
| 4,526,002 | 7/1985 | Bibow | 60/293 |
| 5,167,934 | 12/1992 | Wolf | 60/298 |

FOREIGN PATENT DOCUMENTS

| | | | |
|---|---|---|---|
| 57-79212 | 5/1982 | Japan . | |
| 145320 | 8/1984 | Japan | 60/305 |

*Primary Examiner*—Douglas Hart
*Attorney, Agent, or Firm*—Howard L. Rose

[57] ABSTRACT

An internal combustion engine has a cylinder assembly including a cylinder block and a cylinder head mounted thereon, the cylinder assembly having an exhaust passage defined in the cylinder block and a water jacket defined therein around the exhaust passage. A water jacket cover is mounted on an outer surface of the cylinder block in covering relation to the water jacket, and has an opening defined therein. The cylinder block has an air inlet passage defined therein across the water jacket and communicating with the opening and the exhaust passage. A valve cover is mounted on an outer surface of the water jacket cover. The water jacket cover and the valve cover jointly define a valve chamber therebetween. A valve is disposed in the valve chamber for selectively introducing air from the valve chamber through the opening and the air inlet passage into the exhaust passage to assist in burning harmful unburned components contained in an exhaust gas flowing through the exhaust passage. The water jacket is positioned between the exhaust passage and the valve for preventing the valve from being adversely affected by the heat of the exhaust gas flowing through the exhaust passage.

11 Claims, 1 Drawing Sheet

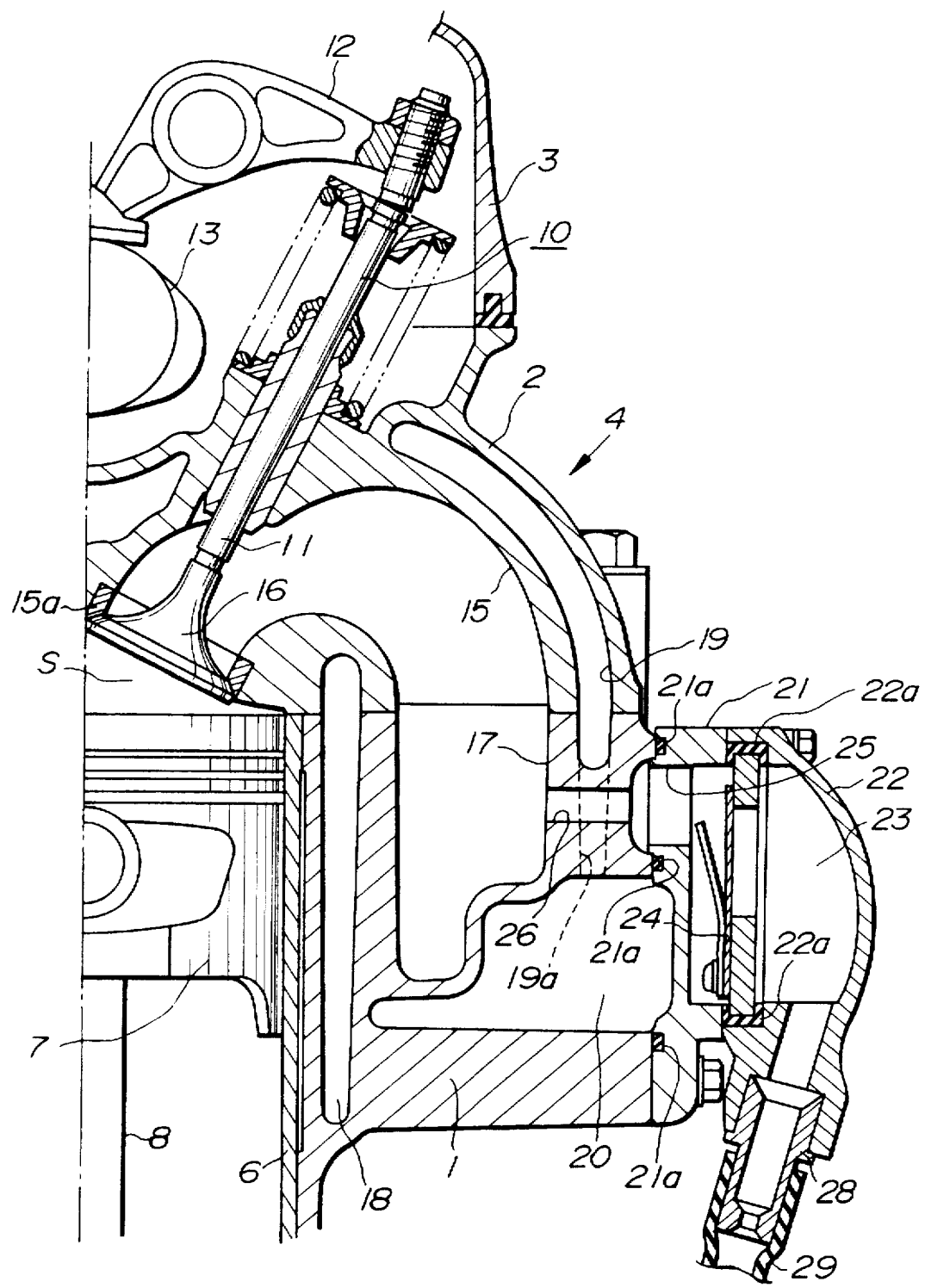

AIR INLET STRUCTURE FOR EXHAUST PASSAGE IN ENGINE

BACKGROUND OF THE INVENTION

1. Field of the Invention

The present invention relates to an air inlet structure for introducing air into an exhaust passage in an internal combustion engine to assist in burning harmful unburned components contained in an exhaust gas flowing through the exhaust passage.

2. Description of the Prior Art

There has been known an internal combustion engine including a cylinder head with an exhaust passage defined therein, the exhaust passage being supplied with secondary air from the outside of the engine for combusting harmful unburned components including HC, CO, etc. contained in the exhaust gas. Such a known internal combustion engine is disclosed in Japanese laid-open patent publication No. 57-79212 published May 18, 1982.

The conventional internal combustion engine has a valve cover mounted on an outer surface of the cylinder head and having a valve chamber defined therein which houses a valve. Air is delivered from the valve chamber through the valve into the exhaust passage.

The known air inlet structure is however disadvantageous in that the heat of the exhaust gas flowing through the exhaust passage is transferred to the valve, thus adversely affecting the valve.

SUMMARY OF THE INVENTION

It is therefore an object of the present invention to provide an air inlet structure for use in internal combustion engines which has a valve for introducing air into an exhaust passage, the valve being prevented from being adversely affected by the heat of an exhaust gas flowing through the exhaust passage.

According to the present invention, there is provided an air inlet structure in an internal combustion engine, comprising a cylinder assembly including a cylinder block and a cylinder head mounted thereon, the cylinder assembly having an exhaust passage defined therein and a water jacket defined therein around the exhaust passage, a water jacket cover mounted on an outer surface of the cylinder assembly in covering relation to the water jacket, the water jacket cover having an opening defined therein, the cylinder assembly having an air inlet passage defined therein across the water jacket and communicating with the opening and the exhaust passage, a valve cover mounted on an outer surface of the water jacket cover, the water jacket cover and the valve cover jointly defining a valve chamber therebetween, and a valve disposed in the valve chamber for selectively introducing air from the valve chamber through the opening and the air inlet passage into the exhaust passage.

The exhaust passage may be defined in the cylinder block, the water jacket cover being mounted on the cylinder block. The air inlet passage may be defined in the cylinder block. The water jacket may be positioned between the exhaust passage and the valve.

According to the present invention, there is also provided an air inlet structure in an internal combustion engine, comprising a cylinder assembly including a cylinder block and a cylinder head mounted thereon, the cylinder assembly having an exhaust passage defined therein for discharging an exhaust gas and a water jacket defined therein for circulating a coolant, and valve means mounted on an outer surface of the cylinder assembly for introducing air into the exhaust passage, the water jacket being positioned between the exhaust passage and the valve means.

The water jacket may extend around the exhaust passage.

The air inlet structure may further comprise a water jacket cover mounted on an outer surface of the cylinder assembly in covering relation to the water jacket, the water jacket cover having an opening defined therein, the cylinder assembly having an air inlet passage defined therein across the water jacket and communicating with the opening and the exhaust passage, and a valve cover mounted on an outer surface of the water jacket cover, the water jacket cover and the valve cover jointly defining a valve chamber therebetween, the valve means comprising a valve disposed in the valve chamber for selectively introducing air from the valve chamber through the opening and the air inlet passage into the exhaust passage. The exhaust passage may be defined in the cylinder block, the water jacket cover being mounted on the cylinder block. The air inlet passage may be defined in the cylinder block.

The heat of an exhaust gas flowing through the exhaust passage is blocked by the water jacket and hence does not adversely affect the valve.

The above and further objects, details and advantages of the present invention will become apparent from the following detailed description of a preferred embodiment thereof, when read in conjunction with the accompanying drawings.

BRIEF DESCRIPTION OF THE DRAWINGS

The sole figure is a fragmentary horizontal cross-sectional view of an internal combustion engine incorporating an air inlet structure according to the present invention.

DETAILED DESCRIPTION OF THE PREFERRED EMBODIMENT

An air inlet structure according to the present invention is typically incorporated in an internal combustion engine for use as a power unit on a boat, such as an outboard engine, as shown in the sole figure. Usually, the internal combustion engine is mounted on the stern of a boat with its vertical crankshaft extending vertically.

The internal combustion engine has a cylinder block 1, a cylinder head 2 mounted on the cylinder block 1, and a head cover 3 mounted on the cylinder head 2. The cylinder block 1, the cylinder head 2, and the head cover 3 jointly serve as an engine cylinder assembly.

The cylinder block 1 has a plurality of cylinders 6 only one shown) defined therein and a plurality of pistons 7 (only one shown) slidably fitted in the respective cylinders 6. The pistons 7 are operatively coupled to a crankshaft (not shown) through respective connecting rods 8.

An exhaust valve 10 associated with each of the cylinders 6 is axially movably supported in the cylinder head 2 and includes a valve stem 11 having an end held in engagement with a rocker arm 12 that is held in sliding contact with a cam 13.

The cylinder head 2 has a combustion chamber S defined therein in communication with each of the cylinders 6. The cylinder block 1 and the cylinder head 2 have an exhaust passage 15 defined therein which has an upstream end connected to the combustion chamber S. The exhaust valve 10 has a valve head 16 positioned remote from its end engaging the rocker arm 12 and openably seated on a valve seat 15a mounted in the upstream end of the exhaust passage 15. The exhaust passage 15 has a downstream end connected through a passage 17 to an exhaust manifold and a muffler (not shown). Therefore, when the exhaust valve 10 is opened, the exhaust gas can be discharged from the combustion chamber S through the exhaust passage 15, the passage 17, the exhaust manifold, and the muffler into the atmosphere.

Water jackets 18, 19, 20 are defined in the cylinder block 1 and the cylinder head 2 for circulating a coolant therethrough to cool the engine during operation thereof. The water jacket 20 is defined in the cylinder block 1 around the exhaust passage 15 and covered with a water jacket cover 21 that is fastened to an outer surface of the cylinder block 1. The water jacket 19 extends around the exhaust passage 15 and has an end portion 19a (indicated by the broken lines) communicating with the water jacket 20.

A valve cover 22 is mounted on an outer surface of the water jacket cover 21, with a valve chamber 23 defined between an inner surface of the valve cover 22 and the outer surface of the water jacket cover 21. The valve chamber 23 houses a valve 24 which can be opened in one direction only. The water jacket cover 21 has an opening 25 defined therein which is held in communication with an air inlet passage 26 defined in the cylinder block 1 across the water jacket 19 and opening into the passage 17. Therefore, the valve chamber 23 and the exhaust passage 15 are held in communication with each other through the opening 25 and the air inlet passage 26 insofar as the valve 24 is open. An air tube 29 is connected through a joint 28 to the valve cover 22 in communication with the valve chamber 23. The water jackets 19, 20 are positioned between the exhaust passage 15 and the valve chamber 23 and hence the valve 24 housed therein.

The cylinder block 1 is molded of aluminum alloy by die casting. The air inlet passage 26 and the water jacket 20 extend in one direction such that cores used to define the air inlet passage 26 and the water jacket 20 in the cylinder block 1 can be removed in the same direction. Therefore, when the cylinder block 1 is die-cast, the air inlet passage 26 and the water jacket 20 can easily be defined in the cylinder block 1.

A heat-insulating member may be interposed between the inner surface of the water jacket cover 21 and the outer surface of the cylinder block 1 on which the water jacket cover 21 is mounted.

In operation, air flowing in from the air tube 29 enters the valve chamber 23, opening the valve 24. The air then flows through the opening 25 and the air inlet passage 26 into the exhaust passage 15. In the exhaust passage 15, the supplied air burns harmful unburned components including HC, CO, etc. contained in the exhaust gas, thus removing these unburned components from the exhaust gas.

With the illustrated arrangement, the water jacket cover 21 which defines the water jacket 20 and the valve cover 22 mounted on the outer surface of the water jacket cover 21 jointly define the valve chamber 23 therebetween, and the valve 24 is disposed in the valve chamber 23. Since the water jackets 19, 20 are positioned between the exhaust passage 15 and the valve 24, the heat of the exhaust gas flowing through the exhaust passage 15 is blocked by the water jackets 19, 20, and is not transferred to the valve 24. Accordingly, the valve 24 is prevented from being adversely affected by the heat of the exhaust gas that flows through the exhaust passage 15.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. An air inlet structure in an internal combustion engine, comprising:

a cylinder assembly including a cylinder block and a cylinder head mounted thereon, said cylinder assembly having an exhaust passage defined therein and a water jacket defined therein around said exhaust passage;

a water jacket cover mounted on an outer surface of said cylinder assembly in covering relation to said water jacket, said water jacket cover having an opening defined therein, said cylinder assembly having an air inlet passage defined therein across said water jacket and communicating with said opening and said exhaust passage;

a valve cover mounted on an outer surface of said water jacket cover;

said water jacket cover and said valve cover jointly defining a valve chamber therebetween; and a valve disposed in said valve chamber for selectively introducing air from said valve chamber through said opening and said air inlet passage into said exhaust passage.

2. An air inlet structure according to claim 1, wherein said exhaust passage is defined in said cylinder block, said water jacket cover being mounted on said cylinder block.

3. An air inlet structure according to claim 2, wherein said air inlet passage is defined in said cylinder block.

4. An air inlet structure according to claim 1, wherein said water jacket is positioned between said exhaust passage and said valve.

5. An air inlet structure in an internal combustion engine, comprising:

a cylinder assembly including a cylinder block and a cylinder head mounted thereon, said cylinder assembly having an exhaust passage defined therein for discharging an exhaust gas and a water jacket defined therein for circulating a coolant; and valve means mounted on an outer surface of said cylinder assembly for introducing air into said exhaust passage, said water jacket being positioned between said exhaust passage and said valve means.

6. An air inlet structure according to claim 5, wherein said water jacket extends around said exhaust passage, a water jacket cover mounted on an outer surface of said cylinder assembly in covering relation to said water jacket, said water jacket cover having an opening defined therein, said cylinder assembly having an air inlet passage defined therein across said water jacket and communicating with said opening and said exhaust passage; and a vale cover mounted on an outer surface of said water jacket cover;

said water jacket cover and said valve cover jointly defining a valve chamber therebetween;

said valve means comprising a valve disposed in said valve chamber for selectively introducing air from said valve chamber through said opening and said air inlet passage into said exhaust passage.

7. An air inlet structure according to claim 5, further comprising:

a water jacket cover mounted on an outer surface of said cylinder assembly in covering relation to said water jacket, said water jacket cover having an opening defined therein, said cylinder assembly having an air inlet passage defined therein across said water jacket and communicating with said opening and said exhaust passage; and a valve cover mounted on an outer surface of said water jacket cover;

said water jacket cover and said valve cover jointly defining a valve chamber therebetween;

said valve means comprising a valve disposed in said valve chamber for selectively introducing air from said valve chamber through said opening and said air inlet passage into said exhaust passage.

8. An air inlet structure according to claim 7, wherein said exhaust passage is defined in said cylinder block, said water jacket cover being mounted on said cylinder block.

9. An air inlet structure according to claim 8, wherein said air inlet passage is defined in said cylinder block.

10. A structure for introducing air into an exhaust passage of an internal combustion engine comprising:

a cylinder assembly having said exhaust passage and a water jacket around said exhaust passage;

an air source;

an air passage communicating between said exhaust passage and said air source;

a valve disposed in said air passage;

said cylinder assembly including a cylinder block molded by die-casting, said cylinder block having a first cavity forming a part of said exhaust passage, a second cavity forming a part of said water jacket and a third cavity forming a part of said air passage, all defined in said die-casted cylinder block;

said second cavity having a side opening to the side of said cylinder block;

a cover closing said open side of said second cavity; and said third cavity extending in proximity of said second cavity and opening to the side of said cylinder block on the same side as said open side of said second cavity whereby said second cavity and said third cavity extend in the same direction.

11. A structure according to claim 10, wherein said cover is mounted on the side of said cylinder assembly and has an opening constituting another part of said air passage; and said valve being disposed between said opening of said cover and said air source.

* * * * *